July 10, 1945.                A. F. CONNERY                2,379,866
                          DUPLEX BALANCE INDICATOR
                            Filed July 10, 1943
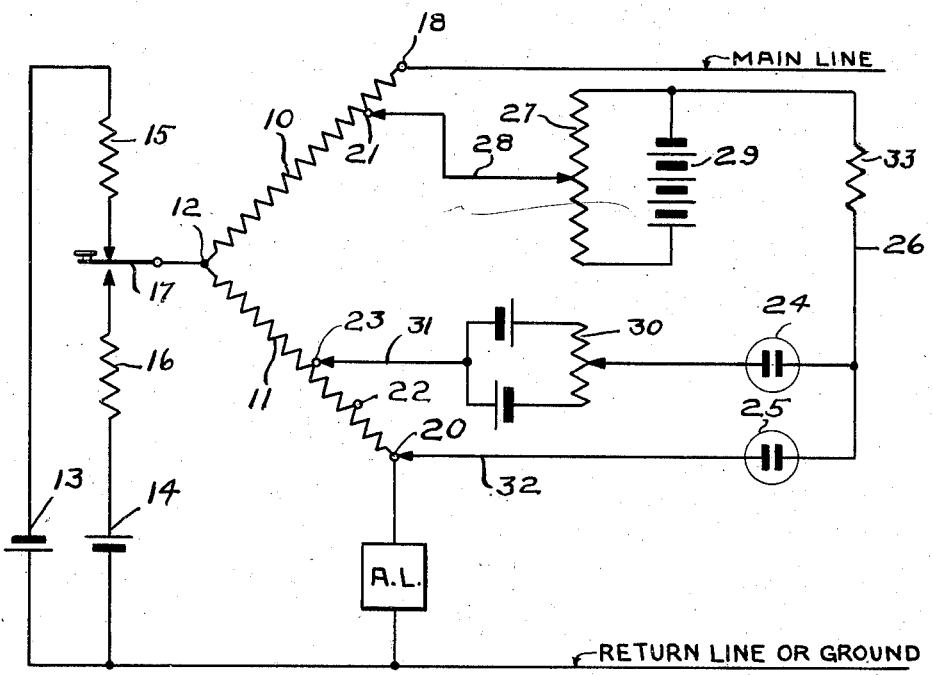
INVENTOR
Alder F. Connery
BY Darby & Darby
ATTORNEYS Patented July 10, 1945

2,379,866

UNITED STATES PATENT OFFICE 2,379,866

DUPLEX BALANCE INDICATOR

Alder F. Connery, Great Neck, N. Y., assignor to Postal Telegraph-Cable Company, (New York), New York, N. Y., a corporation of New York Application July 10, 1943, Serial No. 494,172

6 Claims. (Cl. 178—69)

The present invention relates to duplex telegraphy and particularly to a method of indicating the condition of balance as between the main and artificial lines of a duplex telegraph system.

In duplex telegraphy, as is well known, signals are transmitted simultaneously in both directions, this being accomplished by virtue of the artificial line at each station, which line balances the real line extending between the stations. Due to this arrangement the transmitted signals are split into two parts, one of which passes through a portion of the receiving circuit to the main line and the other of which passes through another portion to the artificial line. The receiving circuit is thus acted upon by both portions of the transmitted signal current but in opposite directions so that when the artificial line balances the real line the effects of the transmitted signal are balanced out and the received signal only is effective to actuate the receiving apparatus.

It is common practice to periodically stop transmission on a duplex telegraph line and to balance the system during the period of stoppage. Of course, this is wasteful of line time, and furthermore there is no assurance that there will not be unbalance existing between periodic balancings of the circuit. This unbalance may be sufficient to interfere with the reception of signals and thus of itself causes waste of line time. Furthermore, during periods of varying weather conditions over the line the frequency with which the line must be balanced increases.

It is an object of the present invention to make it possible to procure an indication of the condition of the line with respect to balance while the telegraph circuit is in operation.

It is another object of the invention to provide equipment for giving such an indication which not only indicates whether or not the line is in balance, but if unbalanced whether the unbalance is caused by too much or too little resistance in the artificial line.

It is a further object of the invention to provide a method of indicating unbalance which can be performed with the use of very little equipment, and without the danger of interruption to the normal transmission.

Other objects and features of the invention will appear when the following specification is considered in connection with the annexed drawing, in which there is shown a schematic diagram of one terminal of the duplex telegraph system.

Referring now to the drawing, the resistances 10 and 11 are resistances in the two legs of the duplex circuit and are joined at the point 12, which is therefore the point commonly known as the "split" of the duplex. It will be understood that in a bridge type duplex the resistances 10 and 11 will each be in series with one of the bridge arms while in a differential type duplex the resistances 10 and 11 will each be in series with one of the windings of the differential receiving relay.

The opposite ends of the resistances 10 and 11 are connected respectively to the main line and to the artificial line in the usual manner. The main line, of course, extends to the distant station and the artificial line is connected either to a metallic return or to ground. Transmission is effected by applying either positive or negative battery from the batteries 13 and 14 through the limiting resistances 15 and 16 and the key 17 to the split of the duplex.

Referring again to the drawing it will be clear that if the real and artificial line are in balance and the resistances 10 and 11 equal, then the transmitted currents through resistances 10 and 11 will be equal. Futhermore, the voltage from point 12 to point 18 will be equal to the voltage between points 12 and 20 and the voltage between points 18 and 20 will be zero. It will also be clear that the voltage between any two similar points such as points 21 and 22 on the resistances 10 and 11 will be zero. The voltage between points 21 and 20 will be unequal. If a point 23 is selected electrically as distant from point 22 as is point 20, then the resistance from point 22 to point 23 is equal to the resistance between points 22 and 20. Moreover, the voltage between points 21 and 20 will be equal but opposite in sign to that between points 21 and 23.

If we now suppose that the resistance of the artificial line is no longer equal to but is larger than that of the main line, then it will be clear that the voltage from point 12 to point 18 will be greater than the voltage from point 12 to point 20, and the voltage from point 12 to point 21 may be greater than, equal to, or less than that from point 12 to point 20. Thus the voltage between points 21 and 20 may be less than it was with the artificial line balanced, may be zero, or may be greater than before, but if the latter is the case, of opposite polarity. However, unless the artificial line resistance is made infinite, the voltage between points 21 and 20 must be less than the voltage between 21 and 23 which will always increase with an increase in the artificial line resistance above that required for balance.

To explain these conditions in a somewhat different way, it will be seen that with the duplex balanced the voltage from point 21 to point 23 equals that from point 21 to point 20, although opposite in sign. The voltage from point 21 to point 23 exists because the voltage from point 12 to point 23 is smaller than that from point 12 to point 21. Therefore, as the resistance of the artificial line is increased, thus reducing the voltage from point 12 to point 20, the voltage from point 12 to point 23 becomes smaller and since the voltage from point 12 to point 21 remains constant, the voltage from 21 to 23 will rise by exactly the amount of the reduction from 12 to 23. On the other hand the voltage between points 21 and 20 exists only because at the time of balance the voltage from 12 to 20 is larger than the voltage 12 to 21. Thus as the artificial line resistance is increased and the voltage from 12 to 20 decreased, the voltage from 21 to 20 will first decrease to zero (which will occur when the voltage 12 to 20 is equal to the voltage 12 to 21), and will then again increase, but will then be of opposite sign. It will be seen that once the voltage occurring between points 21 and 20 has passed through zero it will be equal to the voltage between points 21 and 23 minus the voltage between points 23 and 20. Thus it follows that with the artificial line resistance higher than that for balance the voltage from point 21 to point 23 will always be greater than that from point 21 to point 20.

By the same reasoning it follows that if the artificial line resistance is less than that required for balance the voltage from point 21 to point 20 will always be greater than that from point 21 to point 23.

Any voltage developed between points 12 and 21 by the incoming signal will add algebraically to the voltages between points 21 and 23 and those between points 21 and 20. Since the voltages between points 21 and 20 and points 21 and 23 may be, and in actual practice where the artificial line unbalance is never allowed to become great, are of opposite polarity, there will be an addition in one case and subtraction in the other. Upon the reversal of either the incoming or the transmitted signal one set of signs will reverse and the voltages before added are now of opposite sign and are subtractive and vice versa.

To illustrate the foregoing, let us assume that the artificial line resistance is too high, and that positive battery is supplied to the key 17 of the transmitter (this may, of course, be the tongue of a transmitting relay). Then let us assume that the voltage from point 21 to point 23 is three volts with positive at point 23, and the voltage from point 21 to point 20, two volts with negative at 20. If we add to these voltages an incoming signal voltage between points 12 and 21 of five volts with positive at point 12 we then find that the voltage between points 21 and 23 equals eight volts and that between points 21 and 20 three volts. If now the transmitting key is operated to its other contact and applies negative polarity to the split 12 of the duplex, the voltages between points 21 and 23 and points 21 and 20, due to the transmitted current will be of the same magnitude as before but opposite in sign. Therefore, with the received current the same as before, the total voltage difference between points 21 and 23 will now be two volts and that between points 21 and 20 seven volts. Therefore, it is clear that with the artificial line resistance too great there will always be existing as the circuit operates higher voltages between points 21 and 23 than between points 21 and 20. Similarly, if the artificial line resistance is too low the greater voltage will always occur between points 21 and 20, while if the artificial line resistance is proper the maximum voltages occurring between 21 and 23 and between 21 and 20 will be equal.

Therefore, all that is necessary to determine the condition of the artificial line is to provide some means of indicating whether the maximum voltage between points 21 and 20 is greater than, equal to, or less than that between points 21 and 23. If this is done without disturbing the operation of the circuit, then rebalancing may be carried on while the telegraph circuit is in operation.

While there are many methods of determining the relationship between the peak voltages occurring between points 21 and 23 and 21 and 20, one of the simplest is illustrated in the drawing in order to fully illustrate the method. The indicating device shown in the drawing comprises two neon lamps 24 and 25. One electrode of each of these lamps is connected by means of a conductor 26 and limiting resistor 33 to a potentiometer 27 which supplies a biasing voltage to these lamps. A lead 28 is provided which may be connected to the tap point 21 of the resistance 10 and adjusted upon the potentiometer 27 to supply the proper voltage to lamps 24 and 25. The battery 29 supplying the biasing voltage may be poled as shown or reversely since the adjustment of the potentiometer will have the same effect in either case. The other electrode of lamp 25 is connected to the tap point 20 of resistance 11 and the second electrode of lamp 24 is in like manner connected to the tap point 23 of resistance 11. However, the lamp 24 is connected to point 23 through the biasing potentiometer 30 in order that the lamps may be adjusted so that they will fire at the same voltage level.

In using the device the procedure is as follows: With the indicating circuit comprising the elements just above described disconnected from the telegraph circuit and the leads 28, 31 and 32 connected together, the bias voltage supplied by the potentiometer 27 is increased until either lamp 24 or lamp 25 ignites. If lamp 24 ignites then the voltage supplied by the potentiometer 30 is made more negative while if 25 ignites it is made more positive. Potentiometer 27 is again adjusted to cause the lighted lamp to be extinguished. This procedure is repeated until upon increasing the voltage supplied by potentiometer 27 both lamps light at the same time. When this is achieved the set is in balance and ready for use.

Thereupon the connections indicated in the drawing are made, that is conductor 28 is connected to tap point 21, conductor 31 to point 23 and conductor 33 to point 20. The adjustment of potentiometer 27 is first set to make the voltage it supplies a minimum, thereby preventing either lamp from lighting since the signal voltages in the circuit alone are not enough to cause ignition. Then adjustment is slowly made on the potentiometer 27 until one or both of the lamps begins to flash. If the artificial line resistance is set too low, lamp 25 which is marked "low" will flash. Thereupon the artificial line resistance is increased by some suitable value, for example 50 ohms. If this causes the low lamp 25 to cease flashing and the high lamp 24 to begin, the proper value artificial line resistance for balance is somewhere between the old and new values and is so set. If, however, upon adding the 50 ohm increment both lamps begin to flash this setting of the artificial line is the proper one. The setting may be checked by increasing the resistance beyond the 50 ohm increment and noting that the high lamp now lights. If, when the first increment is inserted, the low lamp continues to flash, further increases are made until balance is achieved.

As the artificial line resistance is varied it may be necessary to adjust the setting of the potentiometer 27 slightly from time to time in order to keep the lamps flashing and to reduce the rate of flash to the optimum and confine the flash to one lamp as much as is possible.

Although one method of indicating whether the peak voltage occurs between points 21 and 23 or points 21 and 20 has been described, it is to be understood that this is for the purposes of illustration only and that many other methods might be utilized.

What is claimed is:

1. The method of determining the condition of balance between the real and artificial lines of a duplex telegraph system during operation thereof, which comprises comparing the peak voltage appearing between an arbitrary point on a resistor in the real line leg of the duplex and a point electrically removed a predetermined distance in one direction from the analogous point on a resistor in the artificial line leg of the duplex, with the peak voltage appearing between the said arbitrary point on the resistor in said real line leg and a point electrically removed the predetermined distance in the opposite direction from the analogous point on the said resistor in the artificial line leg of the duplex.

2. The method of determining the condition of balance between the real and artificial lines of a duplex telegraph system during operating thereof, which comprises comparing the maximum voltage appearing between the junction of a resistor in the artificial line leg and the artificial line and a point on a resistor in the real line leg electrically removed a predetermined distance from the junction of the said resistor with the real line, with the maximum voltage appearing between this second point and a point on the first mentioned resistor electrically removed from the junction of the said artificial line resistor and the artificial line twice the said predetermined distance that said second point is removed from the junction of the resistances and the real line.

3. The method of claim 2, characterized in that said predetermined distance is less than half of the length of the said real line resistor.

4. The method of claim 2 further characterized in that the said artificial and real line resistors are equal and the predetermined distance is less than half the length of the said real line resistor.

5. The method of determining the condition of balance between the real and artificial lines of a duplex telegraph system during operation thereof, which comprises applying balanced peak voltage indicating circuits across points in the legs of the duplex circuit, said indicating circuits being biased to cut off, the points across which said indicating circuits are applied being such that one of the two indicators is under control of the voltage from a tap point on a resistor in the real line leg located a predetermined distance from the junction of the resistor and the line, and a point on the artificial line leg located twice the said predetermined distance from the junction of the resistor and the artificial line, and the second of the two indicators is under control of the voltage existing between the said tap point on the real line leg resistor and the junction point between the artificial line leg resistor and the artificial line, and increasing the bias until one or both of the indicators operates, thereby indicating if both indicators operate that the artificial and real lines are balanced and if one indicator only operates that the line is unbalanced, and in which direction.

6. A device for determining a condition of balance and unbalance between the real and artificial lines of a duplex telegraph system during operation thereof, comprising in combination, a resistor in each leg of the duplex, a first tap on the resistor of the real line leg of the duplex at a predetermined distance from the junction of the line with said resistor, a second tap on the resistor in the artificial line leg of the duplex located at a point twice the said predetermined distance from the junction of the artificial line with the said resistor, a third tap at the point of juncture of the artificial line with the said resistor, a pair of balanced indicating circuits each including an indicating device and each being biased to cut off, means to connect one of said circuits from the first tap to the second tap, means to connect the other of said circuits from the first tap to the third tap, and means to gradually change the bias applied to said indicating circuits whereby said indicating devices will indicate when the real and artificial lines are in balance.

ALDER F. CONNERY.